(12) United States Patent
Mecca et al.

(10) Patent No.: US 12,510,811 B2
(45) Date of Patent: Dec. 30, 2025

(54) PROJECTION MEDIA THREE-DIMENSIONAL SIMULATION AND EXTRUSION

(71) Applicant: Universal City Studios LLC, Universal City, CA (US)

(72) Inventors: Anthony A. Mecca, Orlando, FL (US); Alexandre Lupien, Montreal (CA); Steven Beliveau, Montreal (CA)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 18/789,352

(22) Filed: Jul. 30, 2024

(65) Prior Publication Data
US 2024/0385501 A1    Nov. 21, 2024

Related U.S. Application Data

(63) Continuation of application No. 17/469,545, filed on Sep. 8, 2021, now Pat. No. 12,050,395.

(Continued)

(51) Int. Cl.
*G03B 21/10* (2006.01)
*A63J 5/02* (2006.01)
(Continued)

(52) U.S. Cl.
CPC .............. *G03B 21/10* (2013.01); *A63J 5/021* (2013.01); *A63J 21/00* (2013.01); *G02B 30/33* (2020.01); *G02B 30/60* (2020.01); *G03B 21/56* (2013.01); *G03B 21/60* (2013.01);
*G03B 21/606* (2013.01); *G03B 21/62* (2013.01); *H04N 9/3147* (2013.01); *H04N 9/3179* (2013.01);
(Continued)

(58) Field of Classification Search
None
See application file for complete search history.

(56) References Cited

U.S. PATENT DOCUMENTS

| 1,650,341 A | 11/1927 | Goldstein |
| 6,179,619 B1 | 1/2001 | Tanaka |

(Continued)

FOREIGN PATENT DOCUMENTS

| CA | 2815975 A1 | 11/2014 |
| CN | 204334787 U | 5/2015 |

(Continued)

OTHER PUBLICATIONS

Blooloop, Universal Orlando Resort has announced that the eagerly awaited "Dark Arts at Hogwarts Castle" projection mapping experience will make its debut on the Sep. 14.

(Continued)

*Primary Examiner* — David N Werner
(74) *Attorney, Agent, or Firm* — Fletcher Yoder P.C.

(57) ABSTRACT

A three-dimensional (3-D) projection system includes a projector configured to output a projection of light to simulate a 3-D object, an opaque surface configured to receive the projection of light to simulate a portion of the 3-D object on the opaque surface, and a translucent scrim disposed at a boundary of the opaque surface and configured to receive the projection of light to simulate an extension of the 3-D object away from and beyond the boundary of the opaque surface.

22 Claims, 9 Drawing Sheets

Related U.S. Application Data

(60) Provisional application No. 63/082,731, filed on Sep. 24, 2020.

(51) Int. Cl.

| | |
|---|---|
| *A63J 21/00* | (2006.01) |
| *G02B 30/33* | (2020.01) |
| *G02B 30/60* | (2020.01) |
| *G03B 21/56* | (2006.01) |
| *G03B 21/60* | (2014.01) |
| *G03B 21/606* | (2014.01) |
| *G03B 21/62* | (2014.01) |
| *H04N 9/31* | (2006.01) |
| *H04N 13/363* | (2018.01) |
| *G03B 21/14* | (2006.01) |
| *G09F 13/18* | (2006.01) |

(52) U.S. Cl.
CPC ......... *H04N 13/363* (2018.05); *G03B 21/145* (2013.01); *G09F 2013/189* (2013.01)

(56) References Cited

U.S. PATENT DOCUMENTS

| | | | |
|---|---|---|---|
| 6,462,769 B1 | 10/2002 | Trowbridge et al. | |
| 8,857,994 B2 | 10/2014 | Smithwick | |
| 9,219,910 B2 | 12/2015 | Reichow et al. | |
| 9,278,292 B2 | 3/2016 | Vance et al. | |
| 9,472,011 B2 | 10/2016 | Linnell | |
| 9,930,290 B2 | 3/2018 | McNelley et al. | |
| 9,942,539 B2 | 4/2018 | Tait et al. | |
| 9,989,777 B1 | 6/2018 | Comploi et al. | |
| 10,027,937 B1 | 7/2018 | Staton et al. | |
| 2002/0057241 A1 | 5/2002 | Oda et al. | |
| 2003/0052899 A1 | 3/2003 | Walczak et al. | |
| 2005/0219463 A1 | 10/2005 | Bissinger | |
| 2009/0153811 A1 | 6/2009 | Braiman et al. | |
| 2010/0253700 A1 | 10/2010 | Bergeron | |
| 2010/0265319 A1 | 10/2010 | Kadoch | |
| 2010/0302643 A1 | 12/2010 | Larreta | |
| 2012/0050687 A1 | 3/2012 | Berry et al. | |
| 2013/0017894 A1 | 1/2013 | Li | |
| 2014/0118336 A1 | 5/2014 | Smithwick | |
| 2014/0333899 A1 | 11/2014 | Smithwick | |
| 2014/0338399 A1* | 11/2014 | Strauven | ............... C03B 35/163 65/141 |
| 2015/0029314 A1 | 1/2015 | Reichow et al. | |
| 2015/0209681 A1* | 7/2015 | Kropfl | ....................... A63J 5/02 472/57 |
| 2015/0241712 A1 | 8/2015 | Smithwick | |
| 2016/0097971 A1 | 4/2016 | Horikoshi et al. | |
| 2016/0129365 A1* | 5/2016 | Crowder | ................ G02B 30/56 472/61 |
| 2016/0366396 A1 | 12/2016 | Kim et al. | |
| 2018/0017940 A1 | 1/2018 | Smithwick | |
| 2018/0071643 A1 | 3/2018 | Cortelyou et al. | |
| 2018/0213195 A1 | 7/2018 | Junuzovic et al. | |
| 2019/0192990 A1 | 6/2019 | Li | |
| 2020/0086223 A1 | 3/2020 | Matson | |
| 2020/0363636 A1 | 11/2020 | Karafin et al. | |
| 2021/0048683 A1 | 2/2021 | Wood | |
| 2021/0236952 A1 | 8/2021 | Krauthamer | |
| 2022/0080332 A1 | 3/2022 | Tomilchenko et al. | |
| 2022/0094904 A1* | 3/2022 | Mecca | ................. H04N 9/3147 |
| 2022/0253153 A1 | 8/2022 | Guarasci et al. | |
| 2023/0201738 A1 | 6/2023 | Choi et al. | |

FOREIGN PATENT DOCUMENTS

| | | | |
|---|---|---|---|
| EP | 2515547 A2 | 10/2012 | |
| EP | 2515574 A2 | 10/2012 | |
| FR | 546321 A | 11/1922 | |
| GB | 2437928 A | 11/2007 | |
| JP | 2019157552 A | 9/2019 | |
| JP | 2020095108 A | 6/2020 | |
| KR | 20190081114 | 7/2019 | |
| WO | 9726577 A1 | 7/1997 | |
| WO | 2005096095 A1 | 10/2005 | |
| WO | 2007072014 A2 | 6/2007 | |
| WO | 2016089901 A1 | 6/2016 | |
| WO | 2018154458 A1 | 8/2018 | |
| WO | 2019035105 A1 | 2/2019 | |
| WO | 2023022508 A1 | 2/2023 | |

OTHER PUBLICATIONS

Allearsnet,LLC, Once Upon a Time Cinderella Castle Projection Show Magic Kingdom, 1996-2021.
PCT/US2021/051059 Invitation to Pay Additional Fees mailed Jan. 19, 2022.
Limelightprojection, "Top11 3D Projection Mapping Artworks", YouTube, Dec. 22, 2019, https://www.youtube.com/watch?v=jtFthRSqRwQ.
JP Office Action for Japanese Application No. 2023-517376 mailed Apr. 21, 2025.

* cited by examiner

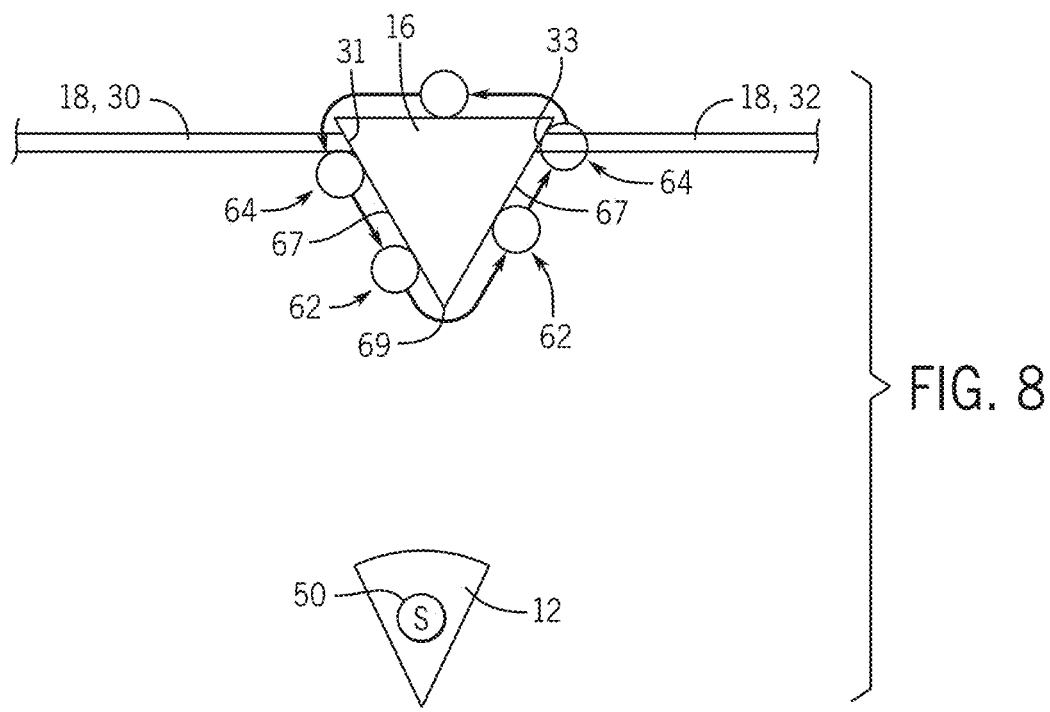
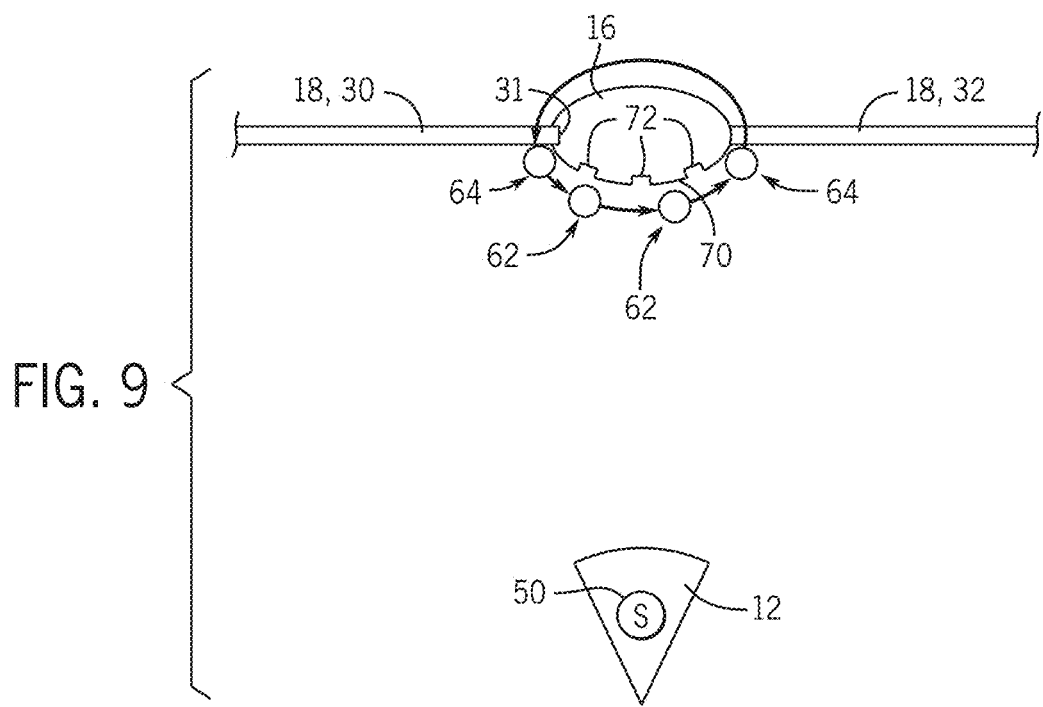

PROJECTION MEDIA THREE-DIMENSIONAL SIMULATION AND EXTRUSION

CROSS-REFERENCE TO RELATED APPLICATION

This application is a continuation of and claims priority to U.S. application Ser. No. 17/469,545, entitled "PROJECTION MEDIA THREE-DIMENSIONAL SIMULATION AND EXTRUSION," filed Sep. 8, 2021, which claims priority to and the benefit of U.S. Provisional Application No. 63/082,731, entitled "PROJECTION MEDIA THREE-DIMENSIONAL SIMULATION AND EXTRUSION," filed Sep. 24, 2020, which are hereby incorporated by reference in their entireties for all purposes

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Theme park or amusement park attractions have become increasingly popular, and have been created to provide guests with unique immersive experiences. Amusement park attractions may include shows, such as light shows, light projections, movies, theater, rides, or combinations thereof to help provide the guests with the unique immersive experiences. For example, certain traditional shows may utilize light to simulate two-dimensional or three-dimensional objects on a screen, where the simulated objects are used to cause an effect and/or tell a story. However, the story and corresponding guest experience may be reduced by hardware and software limitations of traditional systems. Further, traditional systems are limited by architecture, robotics, and show space. For example, traditional systems employing a large array of physical show elements or set props may require a large show space.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In an embodiment, a three-dimensional (3-D) projection system includes a projector configured to output a projection of light to simulate a 3-D object, an opaque surface configured to receive the projection of light to simulate a portion of the 3-D object on the opaque surface, and a translucent scrim disposed at a boundary of the opaque surface and configured to receive the projection of light to simulate an extension of the 3-D object away from and beyond the boundary of the opaque surface.

In an embodiment, a system includes an opaque surface, a transparent or translucent scrim disposed at a boundary of the opaque surface, and a projector (or a combination of multiple projectors) configured to output projections of light onto the opaque surface to simulate a portion of a three-dimensional (3-D) object on the opaque surface and onto the transparent or translucent scrim to simulate an extension of the 3-D object away from and beyond the boundary of the opaque surface.

In an embodiment, a method of simulating a three-dimensional (3-D) object via a projection system includes determining a boundary line between an opaque surface and a scrim disposed adjacent to the opaque surface. The method also includes determining, based on a squinching algorithm, a first set of projection characteristics associated with a first portion of projected light corresponding to the opaque surface and a second set of projection characteristics associated with a second portion of the projected light corresponding to the scrim, where the first set of projection characteristics is different than the second set of projection characteristics. The method also includes outputting, via a projector and based on the boundary line, the first portion of projected light onto the opaque surface to simulate the 3-D object on the opaque surface. The method also includes outputting, via the projector and based on the boundary line, the second portion of projected light onto a scrim to simulate an extension of the 3-D object away from and beyond the opaque surface.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIG. 8 is an overhead view of a portion of the system of FIG. 1 or 4, including a scrim and a wall with two planar surfaces joined at an edge, in accordance with an aspect of the present disclosure;

FIG. 9 is an overhead view of a portion of the system of FIG. 1 or 4, including a scrim and a curvilinear wall with grout lines, in accordance with an aspect of the present disclosure;

DETAILED DESCRIPTION

Figure 1:
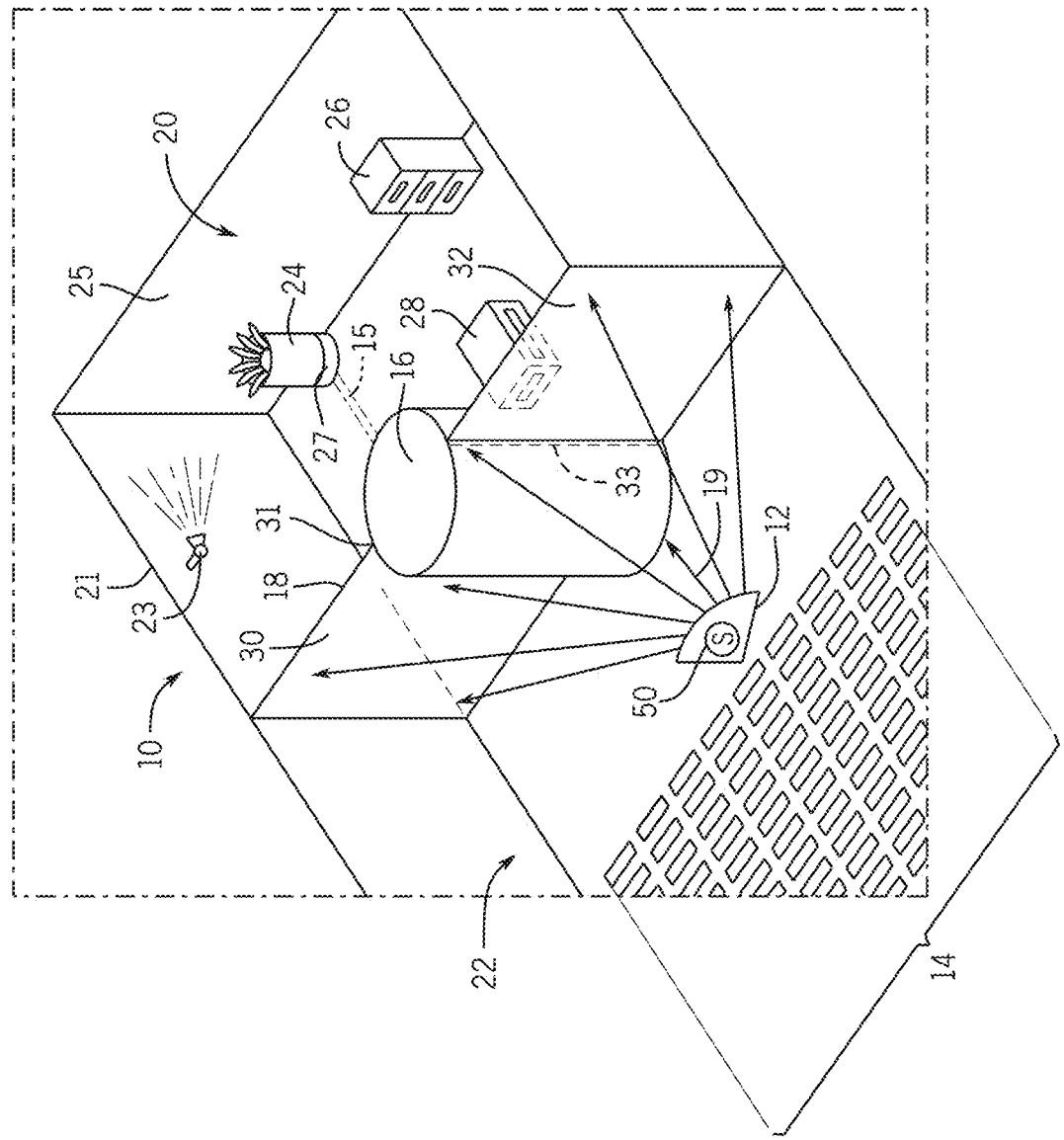
FIG. 1 is an overhead perspective view of a system for simulating three-dimensional (3-D) objects by projecting light via a projector on a wall and a scrim, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to shows included at theme parks, amusement parks, or other entertainment venues. More specifically, the present disclosure relates to simulation of three-dimensional (3-D) objects utilizing a light projector, an opaque surface (e.g., a solid wall), and a transparent or translucent scrim.

Entertainment venues may include shows, such as light shows, to provide to guests unique immersive experiences. Traditional light shows may include, for example, simulations of two-dimensional (2-D) or 3-D objects on a screen. However, traditional systems may include hardware and software limitations that reduce authenticity of the simulated objects and corresponding effect(s) or story involving the simulated objects.

In accordance with the present disclosure, a system may include a projector system (e.g., including one or more projectors) configured to output projections of light onto various surfaces to simulate a 3-D object, such as an opaque surface (e.g., a solid surface of a wall) configured to receive the projection of light to simulate the 3-D object on the opaque surface, and a scrim (e.g., a transparent or translucent scrim) configured to receive the projection of light to simulate an extension of the 3-D object away from and beyond a boundary of the opaque surface. It should be understood that any reference to 3-D objects or systems configured to generate 3-D objects herein does not necessarily imply the use of special glasses or goggles (e.g., anaglyphic glasses). For example, presently disclosed systems are configured to simulate the 3-D objects perceived by the viewer(s) via silhouette extrusion techniques (e.g., projection mapping techniques) described herein and without necessarily utilizing glasses or goggles. While 3-D glasses and stereoscopic 3-D projection are not required, in some embodiments, they may be employed. Additionally, reference to 3-D and 2-D objects is generally indicative of simulated 3-D and 2-D objects, not of physical objects.

Further, the term "scrim" as used herein may refer to any translucent or semi-transparent material capable of bouncing back (e.g., reflecting) light projected onto it, but otherwise appears transparent in the absence of projected light. Accordingly, present embodiments may facilitate simulation of a 3-D object moving around the opaque surface (e.g., a solid surface of a pillar) in part by utilizing the scrim at a boundary of the opaque surface. For example, a simulated ant may be shown climbing along the opaque surface, completely within the boundaries of the opaque surface from the audience's perspective, and then to and beyond an edge of the opaque surface. The semi-transparent scrim adjacent the edge of the opaque surface may reflect the light projected onto it such that the body of the ant appears to extend beyond the opaque surface while its legs remain in contact with the opaque surface. In fact, the simulated 3-D object may be made to appear to transition behind the opaque surface and then reappear at an opposing edge. By incorporating the scrim in the manner described above, simulated 3-D objects can be made to appear to transition on and around opaque surfaces without breaking the illusion of substance (e.g., presence of the simulated 3-D object). While the opaque surface (e.g., solid surface) may include surfaces that would not be considered a wall, examples provided below generally refer to a wall. However, it should be understood that the exemplary wall may be replaced by other opaque surfaces (e.g., a solid surface of a ball, a barrel, a roof, a chair, or some other object) in accordance with present embodiments. Further, a scrim may be defined as a partially reflective material (e.g., a partially mirrored film or netting) that can extend from the opaque surface (e.g., wall). For example, the scrim may be a woven fabric that includes fiberglass.

The projector may determine a boundary line between the wall and the scrim, first projection characteristics suitable for simulating the 3-D object on the wall, and second projection characteristics suitable for simulating the extension of the 3-D object beyond and away from the boundary of the wall via the scrim. The first and second projection characteristics may be determined by the projector or a separate processor via a squinching algorithm that receives various inputs relating to, for example, a position of the viewer(s) relative to the surfaces on which the projector projects light and/or relative to the projector itself, in addition to physical attributes of the wall and/or the scrim. That is, the squinching algorithm may determine the first and second projection characteristics such that the simulated 3-D object and extensions thereof appear proportional in size, shape, color, brightness, and other attributes across different surfaces having different sizes, shapes, and/or reflective qualities.

In some embodiments, the position of the viewer(s) may change during a course of the attraction. For example, the viewer(s) may be positioned on a ride vehicle that travels along a track by the wall and the scrim as the projector projects light onto the wall and/or the scrim to simulate 3-D objects. The projector and/or a separate processor may be configured to determine projection characteristics at any given point in time during the attraction or ride based at least in part on the current position of the ride vehicle. In some embodiments, a path of the ride vehicle is predetermined and the processor determines the projection characteristics based on the ride vehicle position in advance of initiating the attraction or ride. In other embodiments, such as embodiments in which the path of the ride vehicle is not predictable or consistent, the projector or separate processor may be configured to receive sensor feedback indicative of the position of the ride vehicle and determine the projection characteristics based at least in part on the sensor feedback indicative of the position of the ride vehicle. It should be noted that the projector may be configured to simulate 3-D objects in a time sequence, such as to tell a story. The projector and/or separate processor may be programmed to simulate any part of the story with the ride vehicle in any possible position on the track. That is, the projector and/or separate processor is capable of simulating a first part of the show with the ride vehicle in a first position during a first run of the ride vehicle and simulating the first part of the show with the ride vehicle in a second position different than the first position during a second run of the ride vehicle. Of course, the projection characteristics for the first run would be different than the projection characteristics for the second run based on the ride vehicle and viewer(s) being in a different position on the first run than on the second run. In other words, the 3-D objects corresponding to a particular part of the show can be adequately rendered and perceived by viewers by determining projection characteristics based at least in part on the position of the viewer(s).

Further, as previously described, physical properties of the wall and the scrim may be considered when determining projection characteristics for light projected on the wall and the scrim. Accordingly, the projector may determine first projection characteristics suitable for the wall and second projection characteristics suitable for the scrim. Of course, the first projection characteristics suitable for the wall may include subsets of projection characteristics, and the second projection characteristics suitable for the scrim may include subsets of projection characteristics. For example, the first projection characteristics suitable for simulating the 3-D object on the wall may include subsets of characteristics based on various locations of the ride vehicle and/or viewer(s) relative to regions of the wall on which light is projected to simulate the 3-D object, as previously described. That is, different locations on the wall may include different distances from the ride vehicle, viewer, and projector and/or different angles with respect to the projector, and the subsets of projection characteristics may be determined based at least in part on the variable distances and/or angles.

After determining appropriate projection characteristics, the projector may then project light having the first projection characteristics onto the wall and having the second projection characteristics onto or toward the scrim. Certain of the light projected toward the scrim may reflect off the scrim, simulating the extension of the 3-D object away from and beyond the boundary of the wall, and certain of the light projected toward the scrim may pass through the scrim into a background space. As previously described, the projection characteristics may be determined based at least in part on the position or expected position of a ride vehicle and corresponding viewers relative to areas of the wall and/or scrim receiving the projected light, and the projection characteristics may be determined to ensure that the simulated 3-D objects appear realistic (e.g., not warped or distorted) to the viewer(s). In certain embodiments, the background space behind the scrim may be visible through the scrim and may include other show elements, including projection surfaces that support relatively bright projections that can be readily observed through the scrim. The show elements and the simulation of the 3-D object(s) may be utilized to cause an effect and/or to tell a story. For example, background projections (e.g., relatively bright projections on a background projection) and effects may be coordinated with foreground projections (e.g., projections on the wall and scrim) to provide a coordinated effect (e.g., an arrow proceeding from the foreground into the background). These and other features will be described in detail below.

Continuing now with the drawings, FIG. 1 is an overhead perspective view of an embodiment of a system 10 for simulating three-dimensional (3-D) objects by projecting light via a projector 12 onto multiple distinct surfaces. For example, the system 10 includes the projector 12, a wall 16 (e.g., having a solid or opaque material), a scrim 18 (e.g., having a transparent or translucent material or structure), and show elements 24, 26, 28. It should be noted that the terms solid and opaque may be used herein to refer to substantial blockage of radiant energy, such as light, passing therethrough. For example, the wall 16 having solid or opaque material, as used herein, may indicate 90-100% blockage of light passing through the wall 16.

The system 10 may be arranged in a room 21 having an auditorium 22 and a background space 20, where the auditorium 22 and the background space 20 are at least partially separated by the wall 16 and the scrim 18. The background space 20 includes the show elements 24, 26, 28 disposed therein, although other show elements may be disposed in the auditorium 22 along with a seating section 14 for guests. The projector 12 may be disposed in the auditorium 22 or otherwise separated from the background space 20 via the wall 16 and the scrim 18. However, other projectors may be disposed in the background space 20, as will be described with reference to later drawings.

In general, the illustrated projector 12 (which may be representative of a single or multiple projectors) may project light onto the wall 16 to simulate a 3-D object on the wall 16. The projector 12 may also project light onto the scrim 18 to simulate an extension of the 3-D object away from and beyond boundaries 31, 33 of the wall 16. For example, the scrim 18 may include a first portion 30 extending from (or adjacent to) the boundary 31 of the wall 16, and the scrim 18 may include a second portion 32 extending from (or adjacent to) the boundary 33 of the wall 16. As shown, the boundaries 31, 33 may be disposed on a single surface (e.g., a curvilinear wall), as shown, and may be defined by a location of the respective portions 30, 32 of the scrim 18 adjacent to (or contacting) the single surface.

The scrim 18 may be transparent or translucent to guests seated in the seating area 14. In some embodiments, the scrim 18 may include a woven fabric, such as woven fiberglass, that enables the transparent or translucent characteristic of the scrim 18. It should be noted that the scrim 18 may include opaque components (e.g., netting) and openings that combine to make the scrim 18 translucent. For example, solid or opaque portions of the scrim 18 may reflect light while open portions of the scrim 18 will allow the light to pass through. While the scrim 18 is transparent or translucent to guests seated in the seating area 14, the scrim 18 may reflect light received from the projector 12. Thus, portions of the scrim 18 immediately adjacent to the boundaries 31, 33 of the wall 16 may be utilized to simulate extensions of the 3-D objects projected onto the wall 16, where the extensions extend away from and beyond the boundaries 31, 33 of the wall 16. Thus, the visual effect may appear to guests seated in the seating area 14 as though the extension of the 3-D objects are extending into vacant space without a solid surface behind the extensions. These effects may cause the 3-D object to appear as though it moves along the wall 16 toward and beyond either of the boundaries 31, 33, and/or behind the wall 16 and out of view. The perception of the extensions of the 3-D object away from and beyond the boundaries 31, 33 of the wall 16 may reduce apparent flattening of the 3-D object adjacent the boundaries 31, 33 compared to traditional systems.

In some embodiments, the show elements 24, 26, 28 disposed in the background space 20 may interact with the simulated 3-D object to enhance the visual effect and/or story provided by the system 10. The show elements 24, 26, 28 in the illustrated embodiment include a plant, a dresser, and a table, respectively, but may include other show elements (e.g., humans, animals, nature, projections) depending on the show provided by the system 10. In some embodiments, the show elements 24, 26, 28 may be movable (e.g., automatically and/or electronically movable) to enhance the effect or story provided by the system 10. For example, the show elements 24, 26, 28 may be moved to meaningfully interact with the 3-D object simulated via the projector 12, the wall 16, and the scrim 18. The show element 24 (i.e., plant) in the illustrated embodiment, for example, may include a motor assembly 27 configured to move the show element 24 (i.e., plant) across a track 15. Other movement techniques, such as magnetic movement techniques, are also possible. Varying of the depth of the show element 24, as perceived by the guests in the seating area 14, may enhance the show and/or enable interaction effects with the aforementioned simulated 3-D objects.

To facilitate viewing of the show elements 24, 26, 28 through the scrim 18, appropriate lighting may be utilized. For example, one or more relatively bright lights 23 may be provided in the background space 20 to facilitate viewing from the darkened seating area 14. The lights 23 may also be utilized to reduce or negate blow through of light from the projector 12 onto a back wall 25 or other walls, objects (e.g., the show elements 24, 26, 28), or features disposed in or forming the background space 20. For example, light output by the projector 12 and passing through the scrim 18 may, in the absence of reduced or negated blow through, cause portions of the simulated 3-D object to appear in or on aspects of the background space 20. Indeed, light output by the projector 12 toward the scrim 18 may be relatively bright so that images on the scrim 18 appear to be solid or opaque when viewed from the seating area 14. The lights 23 in the background space 20 may be directed toward particular aspects of the background space 20 in order to reduce or negate blow through of the relatively bright light output by the projector 12 and passing through the scrim 18.

Because the wall 16 and the scrim 18 include different materials, geometries, positions, and/or reflection characteristics, among other differences, simulating a 3-D object onto the wall 16 may require different projection characteristics than simulating the 3-D object onto the scrim 18 (i.e., away from and beyond the wall 16). That is, to simulate the same 3-D object (or portions of the same 3-D object) onto both the wall 16 and the scrim 18, different light characteristics may be needed for the wall 16 than for the scrim 18 in order to enhance visual authenticity of the 3-D object across both the wall 16 and areas beyond the wall (i.e., the scrim 18). Thus, the projector 12 may determine a first set of projection characteristics corresponding to the wall 16 and a second set of projection characteristics corresponding to the scrim 18. The projection characteristics may include, for example, a shape, size, boundary, or aspect ratio of the projected light, a brightness of the projected light, a color of the projected light, a resolution of the projected light, or any combination thereof. The projector 12 may determine the first set and/or second set of projection characteristics via a squinching algorithm that receives as inputs various features, such as physical attributes of the wall 16 and the scrim 18, a position of the projector 12, and others. Further, as will be described in detail with respect to FIG. 4 having a system that employs a movable ride vehicle, visual authenticity may be improved by determining projection characteristics based at least in part on a position of the ride vehicle (and viewer[s]) relative to the regions of the surfaces on which the 3-D object is simulated. For example, the first set of projection characteristics may include subsets of projection characteristics corresponding to the position of the ride vehicle relative to various regions of the wall 16 and/or scrim 18 onto which light is projected, such that visual authenticity of the 3-D object is ensured (i.e., warping and distortion is reduced) as the relative position of the ride vehicle changes and a rider's point of view changes in both translation and rotation. A position of the projector 12 (or a distance 19 between the projector 12 and the surfaces onto which light is projected or planned to be projected) may also be an input to the squinching algorithm. By determining first and second sets of projection characteristics for the wall 16 and for the scrim 18 (and subsets thereof), warping of the simulated 3-D objects is reduced or negated and authenticity of the simulated 3-D objects (including movement of the 3-D objects beyond and/or behind the wall 16) is improved, compared to traditional systems.

The projector 12 may also determine and/or control boundary lines provided by the projector 12 between the scrim 18 and the wall 16. That is, the boundary line between the scrim 18 and the wall 16 may be an input to the squinching algorithm for determining projection characteristics. In general, the physical transition between the wall 16 and the scrim 18 may not be seamless (e.g., may include a sharp angle). Further, because the material properties of the wall 16 and the scrim 18 are different, the wall 16 and the scrim 18 may reflect light differently and different projection characteristics may be needed to ensure visual authenticity of the 3-D object on the wall and the scrim may also be different. Accordingly, accurately determining the boundary line between the wall 16 and the scrim 18, and then utilizing the boundary line as an input to the squinching algorithm, may ensure that the 3-D object is not substantially distorted or warped as it passes the boundary line.

Figure 2:
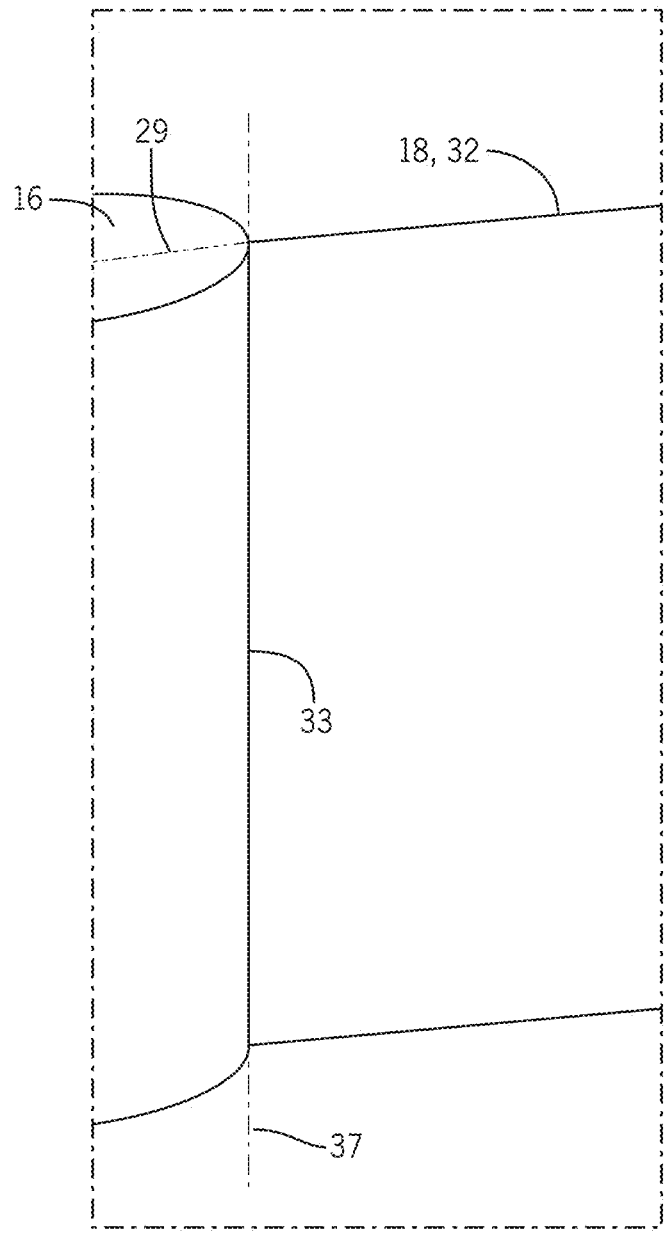
FIG. 2 is an overhead perspective view of a portion of the system of FIG. 1, including a determined boundary line between the wall and the scrim of FIG. 1, in accordance with an aspect of the present disclosure

In the illustrated embodiment, the boundary lines may correspond to, for example, the boundary 31 of the wall 16 adjacent to the first portion 30 of the scrim 18, and the boundary 33 of the wall 16 adjacent to the second portion 32 of the scrim 18. The boundaries 31, 33 in the illustrated embodiment may represent diametrically opposed points (or axial slices) along the wall 16 at which the scrim 18 contacts, intersects, or approaches the wall 16. In FIG. 2, the boundary line 37 determined by the projector 12 of FIG. 1 may correspond to the boundary 33 of the wall 16 adjacent to the portion 32 of the scrim 18. In the illustrated embodiment, the portion 32 of the scrim 18 either abuts the boundary 33 of the wall 16 or extends through the boundary 33 of the wall 16 at a midsection 29 (e.g., diameter) of the wall 16. Thus, the projector 12 of FIG. 1 may determine the boundary line 37 at the boundary 33 of the wall 16. The projector 12 of FIG. 1 may then project light having a first set of characteristics on a first side of the determined boundary line 37 (i.e., on the wall 16) and light having a second set of characteristics on a second side of the determined boundary line 37 (i.e., on the portion 32 of the scrim 18), as previously described.

Figure 3:
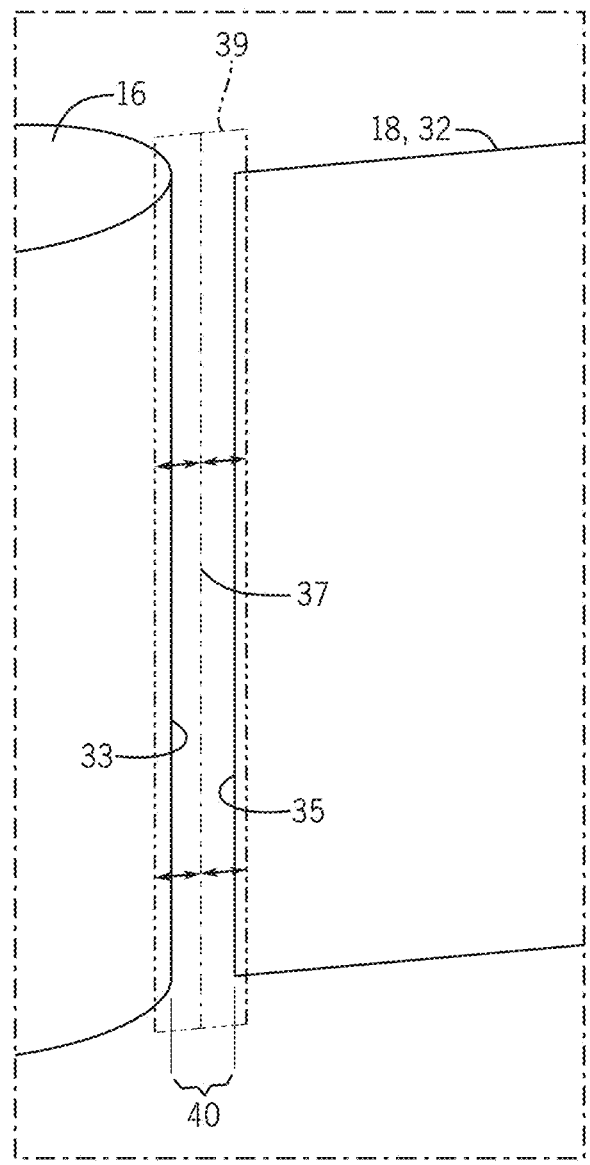
FIG. 3 is an overhead perspective view of a portion of the system of FIG. 1, including a determined boundary line between the wall and the scrim of FIG. 1, in accordance with an aspect of the present disclosure.

In other embodiments, the portion 32 of the scrim 18 may be spaced apart from the boundary 33 of the wall 16. For this reason and/or other reasons, the projector 12 of FIG. 1 may determine the boundary line 37 within a boundary region, which may allow for some error margin. For example, FIG. 3 is a schematic illustration of the boundary line 37 within a boundary region 39 determined by the projector 12 of FIG. 1. As illustrated in FIG. 3, the boundary region 39 may encompass the boundary 33 of the wall 16, a boundary 35 of the portion 32 of the scrim 18, and a space 40 (i.e., gap) between the boundary 33 of the wall 16 and the boundary 35 of the portion 32 of the scrim 18. In the illustrated embodiment, the boundary line 37 is determined (e.g., by the projector 12 of FIG. 1) in the space 40 between the boundary 33 of the wall 16 and the boundary 35 of the portion 32 of the scrim 18. However, the boundary line 37 may be determined anywhere within the boundary region 39. In some embodiments, the system 10 of FIG. 1 may detect and/or determine the boundary line 37 via a sensor, such as via sensor 50 illustrated in FIG. 1. In other embodiments, the projector 12 of FIG. 1 may be positioned relative to the wall 16 and the scrim 18 such that a programmed input to the projector 12 provides for location of the boundary line 37. The projector 12 of FIG. 1 may then project onto the wall 16 (i.e., to the left of the boundary line 37 in FIG. 2) light having the above-described first set of projection characteristics suitable for the wall 16, and onto the scrim 18 (i.e., to the right side of the boundary line 37 in FIG. 2) light having the above-described second set of projection characteristics suitable for the scrim 18.

Figure 4:
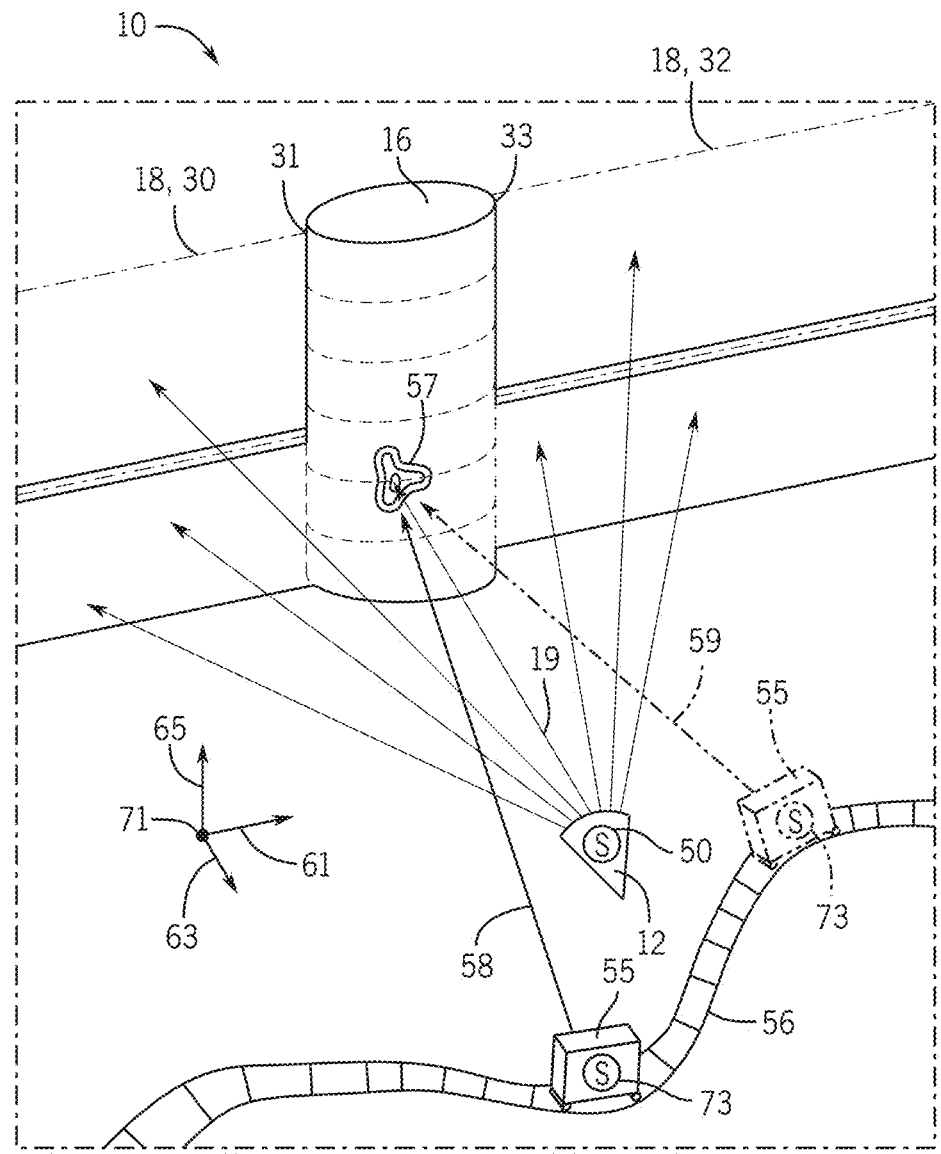
FIG. 4 is an overhead perspective view of a system for simulating 3-D objects by projecting light via a projector on a wall and a scrim during the course of a ride, in accordance with an aspect of the present disclosure.

As previously described, in certain embodiments, a position of the viewer may change during the course of the attraction, ride, or show. For example, the viewer may be positioned in a ride vehicle that moves along a track as 3-D objects are simulated on the wall 16 and the scrim 18. FIG. 4 is an overhead perspective view of a system 10 for simulating 3-D objects by projecting light via a projector 12 on a wall 16 and a scrim 18 during the course of a ride. For example, the illustrated system 10 includes a ride vehicle 55 configured to move along a track 56. As previously described, the projector 12 is configured to project light onto the wall 16 and/or the scrim 18 to simulate a 3-D object 57 perceivable by a viewer in the ride vehicle 55. The projector 12 is configured to determine projection characteristics for a given part of the show based on the position of the ride vehicle 55 (and, thus, viewer) relative to the regions of the wall 16 and/or scrim 18 onto which light is to be projected, or in other words the position of the ride vehicle 55 relative to the position or expected position of the 3-D object 57 on the wall 16 and/or the scrim 18. FIG. 4 represents an illustration of a snapshot of the show while the ride vehicle 55 is a distance 58 away from the 3-D object 57 being simulated on the wall 16. That is, FIG. 4 illustrates a first run of the ride vehicle 55 while the ride vehicle 55 is at a first position and first distance 58 from the 3-D object 57. In a second run of the ride vehicle 55, the ride vehicle 55 may be in a second position relative to the 3-D object 57 being simulated by the projector 12 onto the wall 16 and a second distance 59 from the 3-D object. The processor 12 may determine first projection characteristics of the illustrated 3-D object 57 for the first run and second projection characteristics of the illustrated 3-D object 57 for the second run. The first projection characteristics corresponding to the first run may differ from the second projection characteristics corresponding to the second run due to the different positions of the ride vehicle 55. By determining the first and second projection characteristics based at least in part on the position of the ride vehicle 55, visual authenticity of the illustrated 3-D object 57 is ensured despite the viewer perceiving the illustrated 3-D object 57 from a different position in the first run than in the second run.

The position of the ride vehicle 55 may be determined and/or represented multiple ways. For example, an X-coordinate 61, a Y-coordinate 63, and/or a Z-coordinate 65 of the ride vehicle 55 may be determined. In some embodiments, one dimension (e.g., along the Z-coordinate 65) may be fixed for the ride vehicle 55. Any origin 71 may be used, such as the expected position of the 3-D object 57, a position of the projector 12, or some other position. The distances 58 and 59 may additionally or alternatively be determined and utilized as an input to the squinching algorithm to determine suitable projection characteristics. As previously described, a position of the projector 12 may also be an input to the squinching algorithm.

In certain embodiments employing the illustrated system 10, the various positions of the ride vehicle 55 during various aspects of the light show are predetermined and the projection characteristics are predetermined based on the predetermined positions. However, in certain embodiments, such as embodiments in which the path of the ride vehicle 55 is not consistent or predictable, a sensor 73 may be employed to monitor the position of the ride vehicle 55, and the projector 12 (or a separate processor in communication with the projector 12) may receive feedback from the sensor 73 indicative of the position of the ride vehicle 55, whereby the projector (or the separate processor) determine the appropriate projection characteristics in real-time based on the sensor feedback.

It should be noted that the above-described features may be applicable to an embodiment of the system 10 in which the position of the viewer is fixed and positions of the wall 16 and/or the scrim 18 move, and an embodiment of the system 10 in which the position of the viewer moves and the positions of the wall 16 and/or the scrim 18 move. Indeed, the wall 16 and/or the scrim 18 may be coupled to corresponding tracks or arms that are configured to enable movement of the wall 16 and/or scrim 18, in some embodiments during the course of a ride or show. It should be understood that the position (including orientation) of the ride vehicle 55 and corresponding rider, the wall 16, the scrim 18, and any other component onto which the projector projects light may be monitored, and appropriate projection characteristics may be determined based at least in part on the relative position of the ride vehicle 55 and corresponding rider with respect to the surfaces (e.g., wall 16, scrim 18) receiving projected light to simulate 3-D objects. In monitoring the above-described relative positions, visual authenticity of the 3-D object(s) are ensured for the perspective of the viewer. Further to the points above and as described in detail below, in certain embodiments, multiple projectors may be utilized to simulate the various 3-D objects utilized in the show and/or for other elements of the show or attraction, such as reducing blow through associated with the scrim 18.

Figure 5:
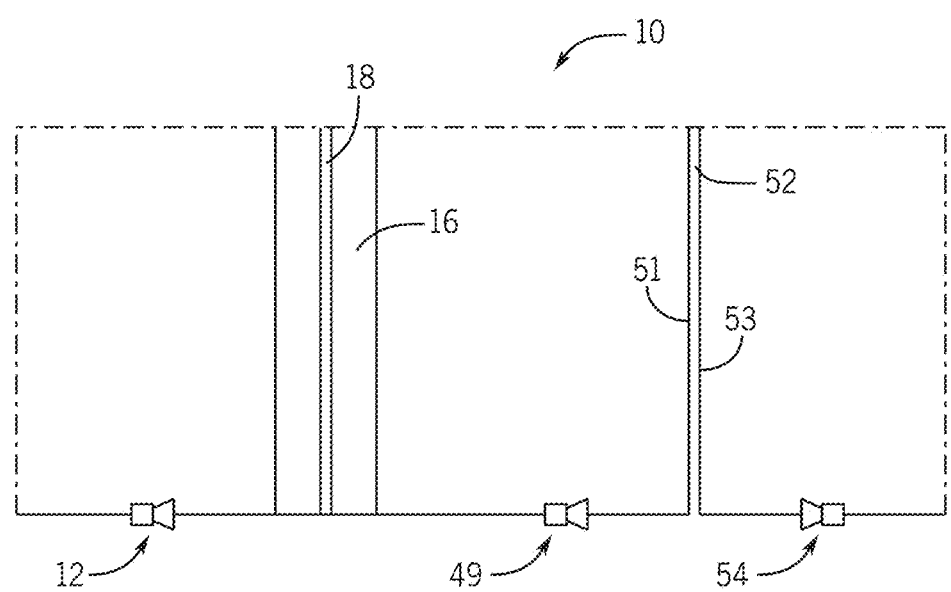
FIG. 5 is a side view of a system for simulating 3-D objects by projecting light via multiple projectors on multiple distinct surfaces, in accordance with an aspect of the present disclosure.

FIG. 5 is a side view of an embodiment of the system 10 including multiple projectors. For example, the system 10 includes the projector 12, the wall 16, the scrim 18, a second projector 49, a second scrim 52, and a third projector 54. The second projector 49 and the third projector 54 may project light onto and/or through opposing respective sides 51, 53 of the second scrim 52, although other scrims and/or projectors may also be incorporated in the system 10. While the projector 12, the wall 16, and the scrim 18 may be utilized to simulate 3-D objects in accordance with the description above, the second projector 49, the second scrim 52, and the third projector 54 may be utilized to simulate similar or other light effects behind the wall 16 and the scrim 18. However, the second projector 49 and the third projector 54, or other projectors not shown in the illustrated embodiment, may additionally or alternatively be utilized to simulate the 3-D objects in conjunction with the projector 12 and/or without the projector 12. For example, in certain embodiments, the second projector 49 may project light onto the scrim 18 to simulate a 3-D object on the scrim 18 (e.g., viewable from the perspective of an audience on the side of the scrim 18 facing away from the second projector 49).

As previously described, show elements may be disposed in any location to interact with the light show for enhancing the visual effects and/or a story provided by the system 10. In some embodiments, the projectors 49, 54 (or other light sources, such as the light 23 in FIG. 1) may be utilized to negate or reduce blow through from the projector 12, as previously described. For example, certain of the light output by the projector 12 toward the scrim 18 may pass through the scrim 18 onto surfaces behind the scrim 18. Light from the projectors 49, 54 (or from other light sources, such as the light 23 of FIG. 1) may be directed onto the surfaces behind the scrim 18 that receive some light from the projector 12, as a means to block or reduce aspects of the 3-D object being simulated on surfaces other than the scrim 18.

Figure 6:
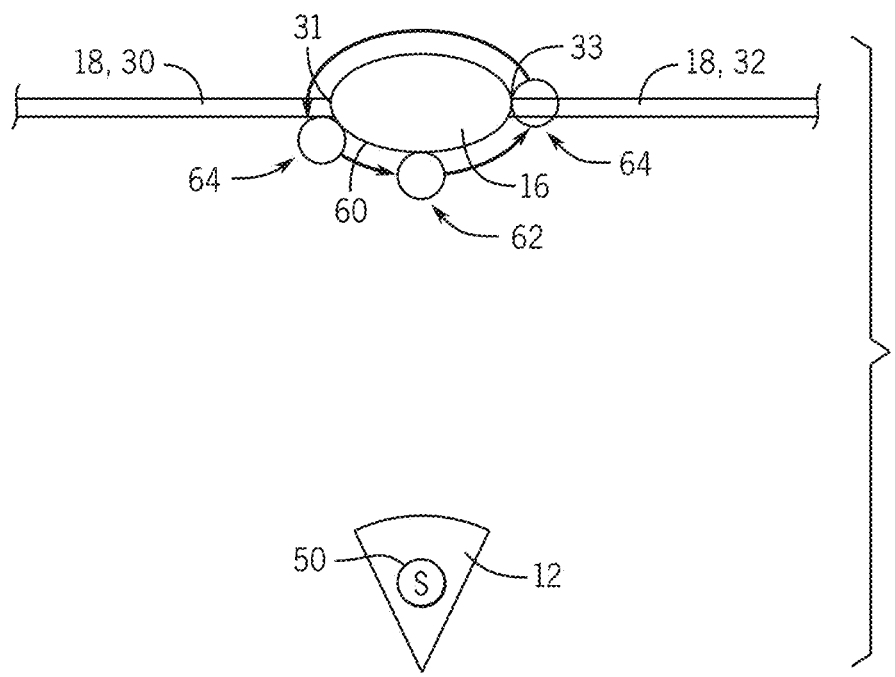
FIG. 6 is an overhead view of a portion of the system of FIG. 1 or 4, including a scrim and a curvilinear wall, in accordance with an aspect of the present disclosure.

FIGS. 6-9 are overhead views of embodiments including portions of the system 10 of FIG. 1 or FIG. 4. FIGS. 6-9 illustrate, for example, the scrim 18 and various surfaces of the wall 16 onto which the projector 12 may project light to simulate the 3-D objects. For example, FIG. 6 illustrates a wall 16 with circular or oval cross-section having a curvilinear surface 60 onto which light is projected to simulate a 3-D object 62. The 3-D object 62 is schematically illustrated in FIG. 6 (and in FIGS. 7-9) as a circle or ball. However, the 3-D object 62 may include any simulated shape, such as nature, a human, an animal, an insect, or a vehicle. The projector 12 may project light onto various locations of the wall 16 (e.g., various locations of the curvilinear surface 60 of FIG. 6) over time to cause an appearance of the simulated 3-D object 62 moving along the wall 16. As previously described, extensions 64 of the simulated 3-D object 62 away from and beyond the curvilinear surface 60 may be simulated by projecting light onto various portions of the scrim 18. Thus, the projector 12 may project light onto the wall 16 and the scrim 18 over time such that the simulated 3-D object 62 appears to move along the wall 16 and even around and behind the wall 16. The extensions 64 of the simulated object 62 may also reduce distortion and/or warping of the simulated 3-D object 62 as the simulated 3-D object 62 passes the boundary 31 or 33 of the wall 16.

Figure 7:
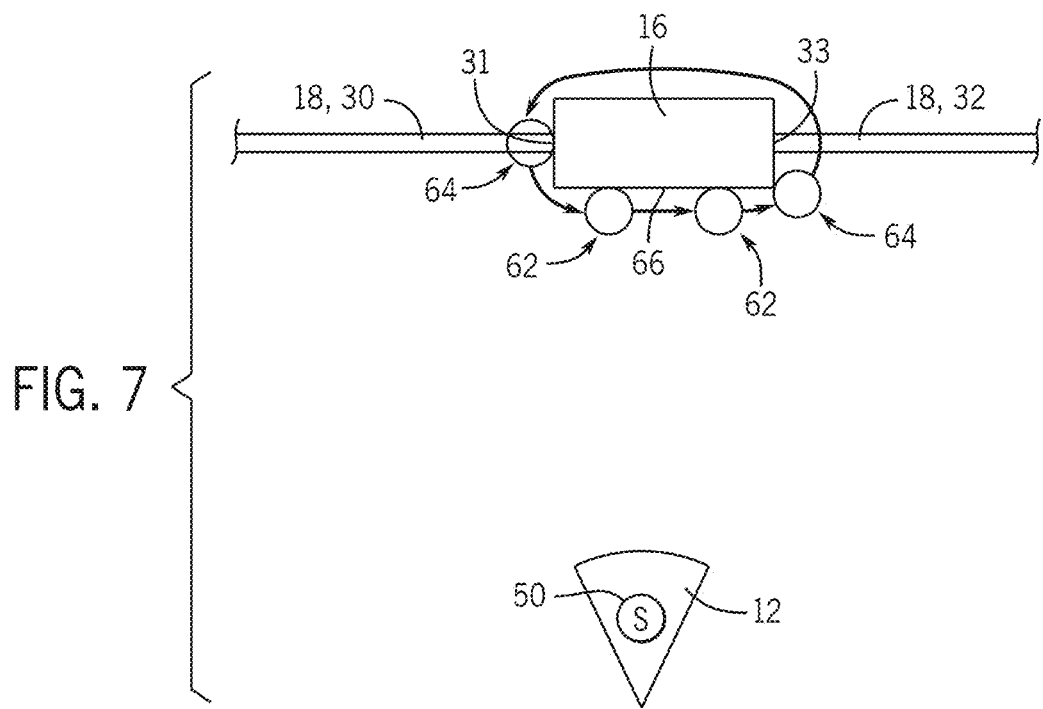
FIG. 7 is an overhead view of a portion of the system of FIG. 1 or 4, including a scrim and a wall with a planar surface, in accordance with an aspect of the present disclosure.

FIG. 7 illustrates the wall 16 with a rectangular shape including a planar surface 66 facing the projector 12 and onto which light is projected by the projector 12 to simulate the 3-D object 62, where the scrim 18 is utilized to simulate an extensions 64 of the 3-D object 62 beyond or away from the planar surface 66 of the wall 16. FIG. 8 illustrates the wall 16 with a triangular shape including multiple planar surfaces 67 joined at an edge 69, where the multiple planar surfaces 67 receive light output by the projector 12 to simulate the 3-D object 62. FIG. 9 illustrates the wall 16 with a circular or oval shape including a curvilinear surface 70 with grout lines 72. Any of the walls 16 and scrim 18 in FIGS. 6-9 may be suitable for simulating the 3-D object 62 thereon. The scrim 18 in the illustrated embodiments is located along the direction of viewing in an offset orientation relative to a forward-most portion of the wall 16 based on the desired perception of depth or the nature of the wall geometry.

Figure 10:
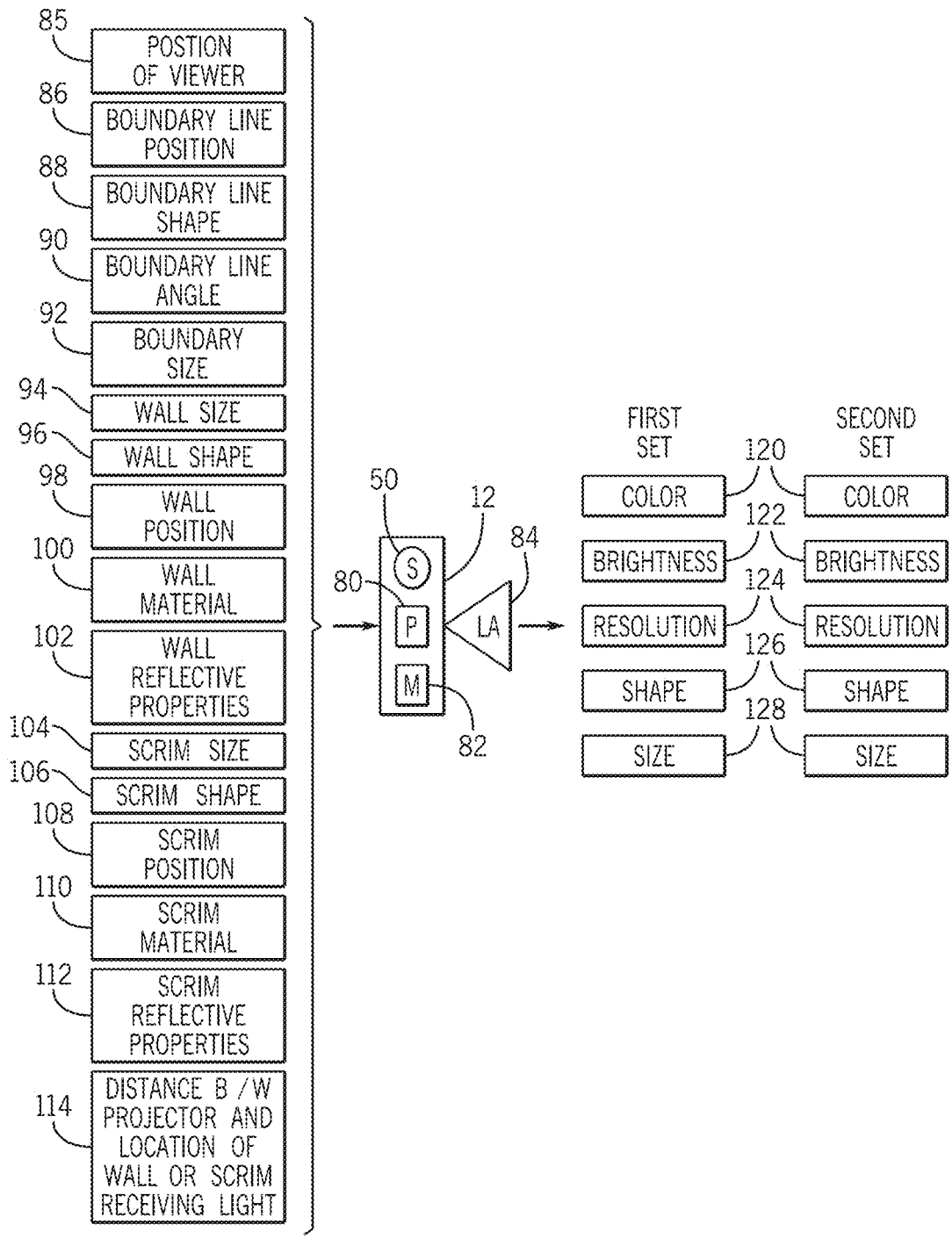
FIG. 10 is a schematic illustration of a projector utilized in FIG. 1 or 4 to determine projection characteristics via a squinching algorithm, in accordance with an aspect of the present disclosure.

FIG. 10 is a schematic illustration of an embodiment of the projector 12 for use in the system 10 of FIG. 1 or FIG. 4. The projector 12 includes a processor 80, a memory 82, and a lens assembly 84 (e.g., one or more lenses). The memory 82 may include instructions stored thereon that, when executed by the processor 80, cause the processor 80 to perform various functions in accordance with the present disclosure. In some embodiments, a controller separate from the projector 12 may include the processor 80 and the memory 82 and may communicate with the projector 12. Further, in some embodiments, multiple instances of the projector 12 may be employed. In such embodiments, each instance of the projector 12 may include a dedicated instance of the processor 80 and the memory 82, or a separate controller may include the processor 80 and the memory 82 and may be configured to communicate with the various instances of the projector 12.

As previously described, the projector 12 may determine or receive first projection characteristics suitable for the wall 16 in, for example, FIG. 4 and second projection characteristics suitable for the scrim 18 in FIG. 4. Of course, as previously described, the projector 12 may determine various subsets of projection characteristics for the wall 16 of FIG. 4 and various subsets of projection characteristics for the scrim 18 of FIG. 4, where the various subsets of projection characteristics are dependent on various inputs including a position of the viewer relative to the effect (i.e., the 3-D object being simulated). For example, projection characteristics determined for a first portion of the wall 16 of FIG. 4 and corresponding to a first part of a story while the ride vehicle is in a first position may differ from projection characteristics determined for the first portion of the wall 16 of FIG. 4 and corresponding to the first part of the story while the ride vehicle is in a second position different than the first position. A squinching algorithm configured to receive the various inputs and utilized to determine the projection characteristics may be stored in the memory 82 and executed by the processor 80. The squinching algorithm may receive as inputs, for example, a position of the viewer 85, a boundary line position 86, a boundary line shape 88, an angle 90 of the boundary line relative to a position of the projector 12, a boundary line size 92, a wall size 94, a wall shape 96, a wall position 98, a wall material 100, wall reflective properties 102, a scrim size 104, a scrim shape 106, a scrim position 108, a scrim material 110, scrim reflective properties 112, a distance between the projector and the location on the wall or scrim receiving light 114, or any combination thereof. Determination of any of the aforementioned positions may include a determination of an X-coordinate, a Y-coordinate, a Z-coordinate, or any combination thereof, where the origin is fixed on a reference point (e.g., as illustrated in, and described with respect to, FIG. 4). Further, the positions may be predetermined (e.g., the component at issue is in a fixed position, or the path of the component at issue is known) or determined based on sensor feedback (e.g., the component at issue is movable and/or a path of the component at issue is not predictable or consistent). The inputs 85, 86, 88, 90, 92, 94, 96, 98, 100, 102, 104, 106, 108, 110, 112, and 114, or any combination thereof, may be manually programmed into the projector 12 in certain embodiments based on relative and/or expected positions of the various features of the system, or the projector may include the sensor 50 to determine at least certain of the inputs 85, 86, 88, 90, 92, 94, 96, 98, 100, 102, 104, 106, 108, 110, 112, and 114. The sensor 50 may include, for example, a thermal light sensor such as an infrared (IR) sensor, a motion sensor, a camera, or any other suitable sensor. Further, the sensor 50 may be integrated with the projector 12 or separate from the projector 12.

The squinching algorithm may receive one or more of the inputs 85, 86, 88, 90, 92, 94, 96, 98, 100, 102, 104, 106, 108, 110, 112, and 114, and determine various projection characteristics as outputs. For example, the squinching algorithm may be utilized to determine projection characteristics including at least one of the following characteristics: color 120, brightness 122, resolution 124, shape 126, or size 128 of projected light. In some embodiments, the shape 126 and size 128 of projected light may be determined in the form of aspect ratio. The output characteristics 120, 122, 124, 126, 128 may be determined in order to ensure that the simulated 3-D object is not flattened, warped, or otherwise perturbed due to differences between the wall and the scrim (e.g., the above-described inputs 85, 86, 88, 90, 92, 94, 96, 98, 100, 102, 104, 106, 108, 110, 112, and 114 related to physical attributes of the wall and the scrim). Further, as previously noted, the squinching algorithm may be utilized to determine the output characteristics 120, 122, 124, 126, 128 for different locations on the wall and for different locations on the scrim. That is, the first set of projection characteristics, for example, may include subsets of projection characteristics that are determined for various locations on the wall that are intended to receive the light to simulate the 3-D object. Indeed, different locations of the wall may include different distances from the projector 12 and/or different angles with respect to the projector 12. Thus, one location on the wall may require different projection characteristics than another location on the wall. Similarly, the projector 12 may determine subsets of characteristics for the second projection characteristics onto the scrim.

In some embodiments, the 3-D object simulated by the projection of light from the projector 12 may be simulated partially on the wall and partially on the scrim at a given moment in time. In such instances, the projector 12 may include the first set of projection characteristics for a first portion of the 3-D object on the wall, and the second set of projection characteristics for a second portion of the 3-D object beyond the wall (i.e., on the scrim). Alternatively, the projector 12 may output the light at a third set of projection characteristics (e.g., for both the wall and the scrim) that interpolates between the first and second projection characteristics. In any case, in certain instances, the projector 12 may project light onto both the wall and the scrim at a single moment in time, thus simulating a portion of the 3-D object on the wall and an additional portion (i.e., extension) of the 3-D object away from and beyond a boundary of the wall. It should be noted that FIG. 10 illustrates the projector 12 as including the processor 80 and memory 82 utilized to execute the above-described squinching algorithm. In certain embodiments, the processor 80 and memory 82 may be separate from the projector 12 and may be utilized to execute the squinching algorithm and to communicate the projection characteristics to the projector 12, which utilizes the projection characteristics to execute the show and corresponding simulation of 3-D objects.

Figure 11:
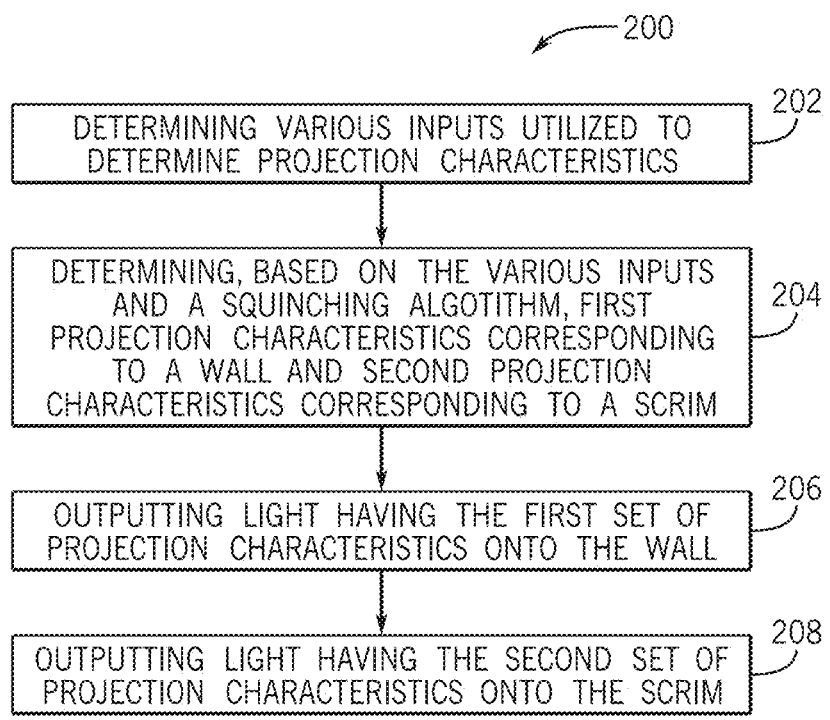
FIG. 11 is a process flow diagram illustrating a method of operating the system of FIG. 1 or 4, in accordance with an aspect of the present disclosure.

FIG. 11 is an embodiment of a process flow diagram illustrating a method 200 of operating the system of FIG. 1. The method 200 includes determining (block 202) various inputs utilized to determine projection characteristics. The inputs, as previously described, may include a position of the viewer (e.g., relative to the effect, namely, the simulated 3-D object), a boundary line position, a boundary line shape, an angle of the boundary line relative to a position of the projector, a boundary line size, a wall size, a wall shape, a wall position, a wall material, wall reflective properties, a scrim size, a scrim shape, a scrim position, a scrim material, scrim reflective properties, distance between the projector and the locations on the wall and/or scrim receiving light, or any combination thereof. The various inputs may be entered (e.g., manually entered) to a processor and/or detected by a sensor communicatively coupled to the processor.

The method 200 also includes determining (block 204), based on the above-described inputs and a squinching algorithm that receives the above-described inputs, first projection characteristics suitable for (or corresponding to) the wall and second projection characteristics suitable for (or corresponding to) the scrim. As previously described, the projection characteristics may include one or more of color, brightness, resolution, shape, size, or aspect ratio of the light output from the projector. Further, as previously described, the projector may determine various projection based on a position of the viewer relative to the simulated 3-D object. That is, the projector may determine projection characteristics for a first portion of the wall based on a first position of the ride vehicle, and different projection characteristics for the first portion of the wall based on a second position of the ride vehicle different than the first position. Likewise, the projector may determine projection characteristics for a first portion of the wall with the ride vehicle in a first position and different projection characteristics for a second portion of the wall with the ride vehicle in the first position. That is, the relative positioning of the ride vehicle and the simulated effect (e.g., simulated 3-D object) may be an input to the aforementioned squinching algorithm.

The method 200 also includes outputting (block 206) the light having the first set of projection characteristics onto the wall, and outputting (block 208) the light having the second set of projection characteristics onto the scrim. As previously described, the squinching algorithm may be utilized to determine the output characteristics for different locations on the wall and for different locations on the scrim. That is, the first set of projection characteristics, for example, may include subsets of projection characteristics that are determined for various locations on the wall that are intended to receive the light to simulate the 3-D object. Indeed, different locations of the wall may include different distances from the projector and/or different angles with respect to the projector. Thus, one location on the wall may require different projection characteristics than another location on the wall. Similarly, the projector 12 may determine subsets of characteristics for the second projection characteristics onto the scrim.

Further, as previously described, the projector may project light onto both the wall and the scrim at a single moment in time (e.g., when the 3-D object approaches and passes the boundary of the wall). In these circumstances, the projector may project light including the first set of projection characteristics for a first portion of the 3-D object on the wall, and the second set of projection characteristics for a second portion (i.e., extension) of the 3-D object beyond the wall (i.e., on the scrim). Alternatively, the projector may output the light at a third set of projection characteristics for both the wall and the scrim, where the third set of projection characteristics is interpolated between the first and second projection characteristics.

Above-described projection systems and methods enhance visual authenticity of simulated 3-D objects included in light shows, and improve versatility of use of the 3-D objects in providing a visual effect and/or telling a story.

For example, above-described projection systems and methods may enable simulation of the 3-D objects beyond and away from wall boundaries without causing flattening or warping of the simulated 3-D objects.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A system comprising:
   a surface;
   a scrim discrete from the surface and disposed at a boundary of the surface; and
   a projector system comprising one or more projectors, wherein the projector system is configured to project light onto the surface and onto the scrim such that a first portion of the light reflected from the surface generates a first portion of a simulated 3-D object and a second portion of the light reflected from the scrim generates a second portion of the simulated 3-D object.

2. The system of claim 1, wherein the first portion of the simulated 3-D object and the second portion of the simulated 3-D object are displayed such that the first portion of the simulated 3-D object appears on the surface and the second portion of the simulated 3-D object appears connected with the first portion of the simulated 3-D object and extending away from the surface.

3. The system of claim 1, wherein the first portion of the light comprises a first set of projection characteristics associated with generation of the first portion of the simulated 3-D object, and the second portion of the light comprises a second set of projection characteristics associated with generation of the second portion of the simulated 3-D object.

4. The system of claim 3, comprising a processing system having one or more processors, wherein the processing system is configured to:
   determine a boundary line corresponding to the boundary between the surface and the scrim;
   instruct the projector system to project the first portion of the light having the first set of projection characteristics on a first side of the boundary line, the first side corresponding to the surface; and
   instruct the projector system to project the second portion of the light having the second set of projection characteristics on a second side of the boundary line, the second side corresponding to the scrim.

5. The system of claim 4, wherein the processing system is configured to:
   determine an additional boundary line corresponding to an additional boundary between the surface and an additional scrim, wherein the additional scrim is configured to reflect a third portion of the light to generate a third portion of the simulated 3-D object, and wherein the third portion of the light comprises a third set of projection characteristics associated with generation of the third portion of the simulated 3-D object;
   instruct the projector system to project the first portion of the light having the first set of projection characteristics on an additional first side of the additional boundary line, the additional first side corresponding to the surface; and
   instruct the projector system to project the third portion of the light having the third set of projection characteristics on an additional second side of the additional boundary line, the additional second side corresponding to the additional scrim.

6. The system of claim 3, wherein the first set of projection characteristics and the second set of projection characteristics comprise at least a shape, a size, a brightness, a color, or a resolution characteristic.

7. The system of claim 3, wherein the first set of projection characteristics is different than the second set of projection characteristics.

8. The system of claim 1, comprising a processing system having one or more processors, wherein the processing system is configured to determine projection characteristics of the first portion of the light, the second portion of the light, or both based on a position of a moving ride vehicle.

9. The system of claim 1, wherein the projector system is configured to output the first portion of the light onto the surface and the second portion of the light onto the scrim at a single moment in time.

10. The system of claim 1, wherein the scrim comprises a translucent scrim.

11. The system of claim 1, wherein the surface comprises an opaque surface.

12. The system of claim 1, wherein the surface comprises a curvilinear surface.

13. One or more tangible, non-transitory, computer readable media comprising instructions stored thereon that, when executed by a processing system having one or more processors, are configured to cause the processing system to:
   receive first data indicative of a first set of projection characteristics corresponding to a first portion of projected light;
   receive second data indicative of a second set of projection characteristics corresponding to a second portion of the projected light;
   cause a projector to output the projected light such that:
      the first portion of the projected light having the first set of projection characteristics is reflected from a surface to generate a first portion of a simulated three-dimensional (3-D) object; and
      the second portion of the projected light having the second set of projection characteristics is reflected from a scrim discrete from and disposed at a boundary of the surface to generate a second portion of the simulated 3-D object.

14. The one or more tangible, non-transitory, computer readable media of claim 13, wherein the first portion of the simulated 3-D object and the second portion of the simulated 3-D object are displayed such that the first portion of the simulated 3-D object appears on the surface and the second portion of the simulated 3-D object appears connected with the first portion of the simulated 3-D object and extending away from the surface.

15. The one or more tangible, non-transitory, computer readable media of claim 13, wherein the instructions, when executed by the processing system, are configured to cause the processing system to:

determine a boundary line corresponding to the boundary between the surface and the scrim;

cause the projector to output the first portion of the projected light having the first set of projection characteristics on a first side of the boundary line, the first side corresponding to the surface; and cause the projector to output the second portion of the projected light having the second set of projection characteristics on a second side of the boundary line, the second side corresponding to the scrim.

16. The one or more tangible, non-transitory, computer readable media of claim 13, wherein the first set of projection characteristics and the second set of projection characteristics comprise at least a shape, a size, a brightness, a color, or a resolution characteristic.

17. The one or more tangible, non-transitory, computer readable media of claim 13, wherein the instructions, when executed by the processing system, are configured to cause the processing system to cause one or more show elements to move such that the one or more show elements appear to interact with the simulated 3-D object.

18. The one or more tangible, non-transitory, computer readable media of claim 13, wherein the first set of projection characteristics is different than the second set of projection characteristics.

19. The one or more tangible, non-transitory, computer readable media of claim 13, wherein the processing system is configured to determine the first data and the second data based on a position of a movable ride vehicle, movement of the movable ride vehicle, or both.

20. A method of generating a simulated three-dimensional (3-D) object via a projection system, comprising:

determining a boundary line between a surface and a scrim discrete from the surface and disposed at a boundary of the surface;

outputting, via a projector and on a first side of the boundary line corresponding to the surface, a first portion of projected light such that the first portion of projected light is reflected from the surface to generate a first portion of the simulated 3-D object; and outputting, via the projector and on a second side of the boundary line corresponding to the scrim, a second portion of projected light such that the second portion of projected light is reflected from the scrim to generate a second portion of the simulated 3-D object.

21. The method of claim 20, comprising outputting, via a light source, additional light into a background space to reduce blow through of the second portion of projected light through the scrim and onto features disposed in or forming the background space.

22. The method of claim 20, comprising determining a first set of projection characteristics corresponding to the first portion of projected light and a second set of projection characteristics corresponding to the second portion of projected light based on a squinching algorithm.

* * * * *